United States Patent
Crow

(10) Patent No.: US 10,861,056 B2
(45) Date of Patent: Dec. 8, 2020

(54) PLACING LOCATIONS IN A VIRTUAL WORLD

(71) Applicant: Facebook, Inc., Menlo Park, CA (US)

(72) Inventor: Dwight Ewing Crow, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 65 days.

(21) Appl. No.: 14/742,629

(22) Filed: Jun. 17, 2015

(65) Prior Publication Data

US 2016/0371744 A1    Dec. 22, 2016

(51) Int. Cl.
*G06Q 30/02*    (2012.01)

(52) U.S. Cl.
CPC .................. *G06Q 30/0275* (2013.01)

(58) Field of Classification Search
CPC .................................................. G06Q 30/0275
See application file for complete search history.

(56) References Cited

U.S. PATENT DOCUMENTS

| | | | |
|---|---|---|---|
| 9,782,668 B1 * | 10/2017 | Golden .................... | A63F 13/00 |
| 2002/0019763 A1 | 2/2002 | Linden et al. | |
| 2003/0046158 A1 * | 3/2003 | Kratky ............... | G06Q 30/0261 705/14.58 |
| 2003/0126035 A1 * | 7/2003 | Kake ........................ | A63F 13/10 463/31 |
| 2005/0021472 A1 * | 1/2005 | Gettman ................ | G06Q 30/02 705/52 |
| 2005/0179685 A1 | 8/2005 | Kake et al. | |
| 2007/0072676 A1 | 3/2007 | Baluja | |
| 2008/0183579 A1 | 7/2008 | Avner | |
| 2009/0132361 A1 | 5/2009 | Titus et al. | |
| 2009/0144148 A1 | 6/2009 | Jung et al. | |
| 2009/0158170 A1 | 6/2009 | Narayanan et al. | |
| 2009/0216546 A1 * | 8/2009 | Huang ................... | G06Q 30/02 705/1.1 |

(Continued)

FOREIGN PATENT DOCUMENTS

| | | |
|---|---|---|
| JP | 2009-509680 A | 3/2009 |
| JP | 2011-523475 | 8/2011 |

(Continued)

OTHER PUBLICATIONS

PCT International Search Report and Opinion, PCT Application No. PCT/US2016/036059, dated Sep. 19, 2016, fifteen pages.

(Continued)

*Primary Examiner* — Mario C. Iosif

(57) ABSTRACT

An online system provides a virtual world including a plurality of locations spatially distributed throughout the virtual world. The online system receives sponsorship requests for generating locations in the virtual world associated with one or more advertisers. A sponsorship request identifies a position in the virtual world for presenting the location and a bid amount specifying an amount of compensation to the online system for presenting the location at the position in the virtual world. When an opportunity to present a location at a position in the virtual world to a user is identified, the online system selects a location from the received sponsorship request for presentation at the position based at least in part on the bid amounts of the sponsorship requests.

18 Claims, 4 Drawing Sheets

(56) References Cited

U.S. PATENT DOCUMENTS

| | | |
|---|---|---|
| 2009/0222424 A1 | 9/2009 | Van |
| 2009/0265604 A1 | 10/2009 | Howard et al. |
| 2010/0017283 A1 | 1/2010 | Hamilton et al. |
| 2010/0174593 A1 | 7/2010 | Cao et al. |
| 2010/0198653 A1 | 8/2010 | Bromenshenkel et al. |
| 2010/0205035 A1 | 8/2010 | Baszucki et al. |
| 2011/0238486 A1 | 9/2011 | Liu et al. |
| 2012/0158473 A1 | 6/2012 | Cox et al. |
| 2012/0166284 A1 | 6/2012 | Tseng |
| 2013/0166364 A1 | 6/2013 | Kusumoto et al. |
| 2013/0275230 A1 | 10/2013 | Sawyer et al. |
| 2013/0311273 A1* | 11/2013 | Huang .............. G06Q 30/0251 705/14.48 |
| 2013/0311297 A1 | 11/2013 | Ramer et al. |
| 2013/0311303 A1 | 11/2013 | Huang |
| 2013/0317950 A1 | 11/2013 | Abraham et al. |
| 2014/0019261 A1* | 1/2014 | Hegeman .............. G06Q 30/02 705/14.71 |
| 2014/0040006 A1 | 2/2014 | Balestrieri et al. |
| 2014/0067596 A1 | 3/2014 | McGovern et al. |
| 2014/0278847 A1* | 9/2014 | Gallo ................ G06Q 30/0252 705/14.5 |
| 2014/0335953 A1 | 11/2014 | Marsland et al. |
| 2015/0242755 A1 | 8/2015 | Gross |

FOREIGN PATENT DOCUMENTS

| | | |
|---|---|---|
| KR | 10-2011-0015519 A | 2/2011 |
| WO | WO 2008/108965 A1 | 9/2008 |
| WO | WO 2015/041798 A1 | 3/2015 |

OTHER PUBLICATIONS

Korean Intellectual Property Office, Office Action, Korean Patent Application No. 10-2018-7000256, dated Jul. 27, 2018, nine pages.

Korean Intellectual Property Office, Office Action, Korean Patent Application No. 10-2018-7000256, dated Mar. 16, 2018, thirteen pages.

Australian Government, IP Australian, Examination report No. 2 for standard patent application, Australian Patent Application No. 2016279805, dated May 22, 2018, three pages.

Japan Patent Office, Office Action, Japanese Patent Appl. No. 2017-565287, dated May 29, 2018, five pages.

Canadian Intellectual Property Office, Office Action, Canadian Patent Application No. 2,989,086, dated Dec. 24, 2018, six pages.

Australian Government, IP Australia, Examination report No. 1 for standard patent application, Australian Patent Application No. 2016279805, dated Jan. 31, 2018, three pages.

Canadian Intellectual Property Office, Office Action, Canadian Patent Application No. 2,989,086, dated Mar. 23, 2018, three pages.

* cited by examiner

PLACING LOCATIONS IN A VIRTUAL WORLD

BACKGROUND

This disclosure relates generally to virtual reality, and in particular to populating a virtual world based on a user profile.

Virtual reality systems are becoming increasingly more popular. New technology, including improved graphics capabilities and dedicated virtual reality headsets and devices, are enabling the development of virtual reality worlds that imitate the physical world. These virtual worlds allow users to perform a wide variety of activities, while interacting with other users of the virtual world and objects provided in the virtual world.

Many virtual worlds provide a standard set of objects, activities, and the like to all users of the virtual world. However, a specific user may not be interested in the standard objects or activities provided in the virtual world. Accordingly, providing the standard set of objects and activities to the specific user may not effectively increase user engagement with the virtual world.

SUMMARY

An online system presents its users with a virtual world in which the users may interact with each other and with virtual objects and locations. Locations are spatially distributed throughout the virtual world, and a user interacting with the virtual world may travel between locations to perform various activities available at different locations, interact with other users at different locations, or interact with objects available at different locations. The online system receives sponsorship requests from one or more advertisers for generating locations in the virtual world associated with the advertisers. A sponsorship request includes a position of a location in the virtual world and a bid amount representing an amount of compensation the online system receives from an advertiser for presenting the location in the sponsorship request via the virtual world. For example, a sponsorship request specifies generation of a location at a point where users enter into the virtual world (a "spawn point"), at a particular position relative to a current position of a user within the virtual world, or along a path between two locations in the virtual world. Hence, providing the online system with a sponsorship request allows an advertiser to create a virtual store or other virtual location providing products or content associated with the advertiser via the virtual world.

When an opportunity to present a location to a user is identified by the online system, the online system selects a location associated with an advertiser from the sponsorship requests. For example, the online system ranks the sponsorship requests based at least in part on their bid amounts and selects a sponsorship request including a maximum bid amount. The online system them generates a location included in the selected sponsorship request and provides the virtual world and provides information for presenting the location to a client device for presentation to a user in the virtual world. For example, the online system provides a graphic of a storefront of the location included in the selected sponsorship request to client devices for presentation to users passing the position associated with the location in the virtual world. As a user interacts with the virtual world via a client device, the advertiser's location is displayed, allowing the user to interact with the location.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
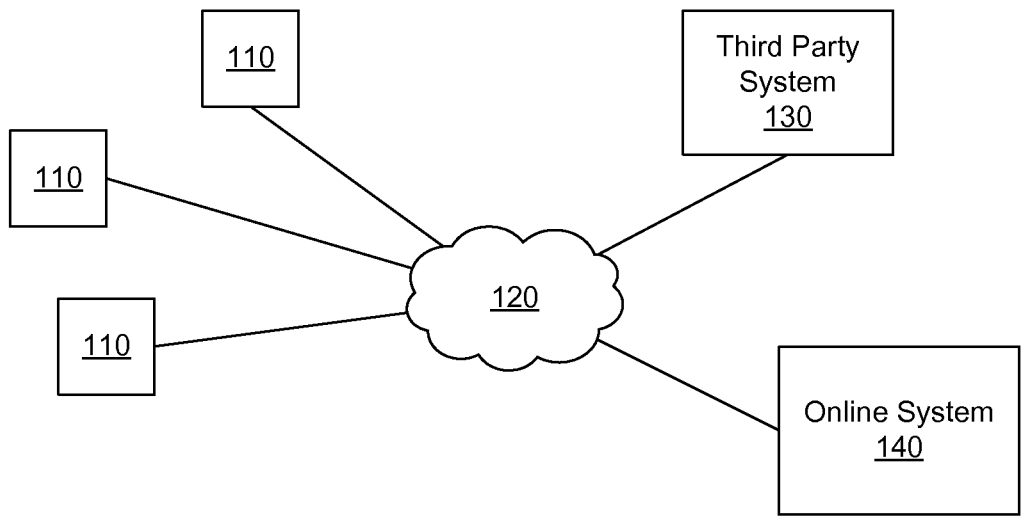
FIG. 1 is a block diagram of a system environment in which an online system operates, in accordance with one embodiment.

FIG. 1 is a high level block diagram of a system environment 100 for an online system 140 providing a virtual world. In one example, the online system 140 is a social networking system allowing its users to communicate and interact with other users. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone, a dedicated virtual reality headset, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an advertiser bidding on and/or providing content for inclusion in a virtual world and presentation via a client device 110. A third party system 130 may also be an application provider communicating information describing applications for execution by a client device 110 or communicating data to client devices 110 for use by an application executing on the client device 110 (optionally within a virtual world), or may communicate information to the online system 140 such as advertisements, content, or information about an application provided by the third party website 130.

Figure 2:
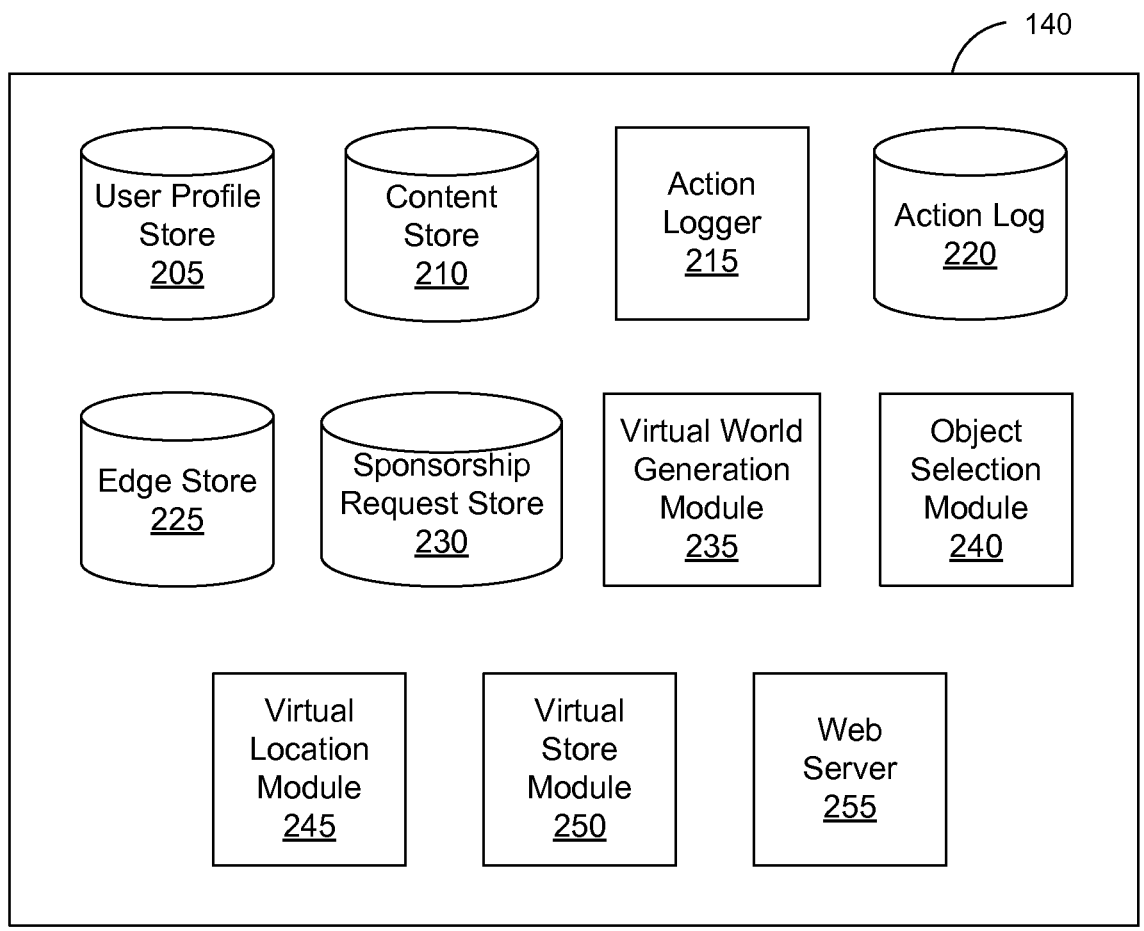
FIG. 2 is a block diagram of an online system, in accordance with one embodiment.

FIG. 2 is a block diagram of an architecture of the online system 140. The online system 140 shown in FIG. 2 includes a user profile store 205, a content store 210, an action logger 215, an action log 220, an edge store 225, a sponsorship request store 230, a virtual world generation module 235, an object selection module 240, a virtual location module 245, a virtual store module 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores online system objects that each represent various types of content. Examples of content represented by an online system object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, online system objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an online system object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with online system objects include: commenting on posts, sharing links, and checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an online system object, or numbers and types of comments posted by a user about an object. The features may also represent information describing a particular online system object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or interest in another user in the online system 140 based on the actions performed by the user. A user's affinity may be computed by the online system 140 over time to approximate the user's interest in an object, in a topic, or in another user in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more sponsorship requests are included in the sponsorship store 230. A sponsorship request includes information describing appearances of objects or locations in a virtual world and a bid amount specifying an amount of compensation the online system 140 receives from an advertiser for displaying the object or the location using the sponsored appearance described by the sponsorship request. In various embodiments, the information describing an appearance of an object or a location may include a landing page specifying a network address to which a user is directed when interacting with the object or the location via the virtual world. The bid amount is associated with an sponsorship request by an advertiser and is used to determine an expected value, such as monetary compensation, provided by an advertiser to the online system 140 if an object or location in the virtual world is presented based on information in the sponsorship request, if a user interacts with an object or location presented based on information in the sponsorship request via the virtual world, or if any suitable condition is satisfied when an object or a location in virtual world is presented based on information in the sponsorship request. For example, the bid amount specifies a monetary amount that the online system 140 receives from the advertiser if an object in the virtual world is presented using information in the sponsorship request. In some embodiments, the expected value to the online system 140 of presenting an object or a location in the virtual world using information in a sponsorship request may be determined by multiplying the bid amount by a probability of the user interacting with the object or the location via the virtual world.

Additionally, a sponsorship request may include one or more targeting criteria specified by the advertiser. Targeting criteria included in a sponsorship request specify one or more characteristics of users eligible to be presented with content in the sponsorship request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user, between a user and an object of the online system 140, or between a user and an object of a virtual world associated with the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Furthermore, targeting criteria may specify interactions of the user with a virtual world associated with the online system 140. For example, targeting criteria identifies users who have visited particular locations within the virtual world, completed particular activities within the virtual world, interacted with particular users or objects within the virtual world, or purchased particular objects within the virtual world. Including actions in targeting criteria allows advertisers to further refine users eligible to be presented with appearances in a virtual world from a sponsorship request. As another example, targeting criteria identifies users having a connection to another user or object or having a particular type of connection to another user or object.

The virtual world generation module 235 provides a virtual world to online system users in which the users may interact with each other and with virtual objects and locations. Objects presented via the virtual world may represent content items or users maintained by the online system 140. Instructions for rendering the virtual world are communicated from the virtual world generation module 235 to a client device 110, which renders the virtual world using two- or three-dimensional graphics, text, and/or audio. A user interacts with objects and other users in the virtual world using input devices of the client device 110 (such as a mouse, a keyboard, or a joystick), hand, body, or eye gestures, voice inputs, or any of a variety of other input mechanisms.

The virtual world generation module 235 populates the virtual world with objects, locations, and representations of other users with which a user of the online system 140 can interact. Representations of other users, such as two- or three-dimensional avatars, may include representations of additional users to whom the user is connected via the online system 140, representations of celebrities, and/or representations of fictional individuals (e.g., characters generated within the virtual world). The user representations may be generated by a designer of the virtual world or generated from images uploaded to the online system 140 (such as an image a user uploads to the user's profile in the online system 140) by users. Alternatively, the virtual world generation module 235 enables users to create their own representations within the virtual world. The user representations are displayed to a user of online system 140 via the virtual world presented by a client device 110, allowing the user to interact with the other users. For example, a user converses with the other users through the virtual world via instant messaging or voice communications, performs activities in the virtual world with the other users, or recommends products to and receives product recommendations from the other users via the virtual world.

Additionally, the virtual world generated by the virtual world generation module 235 includes a plurality of locations spatially distributed through the virtual world. The locations may identify buildings, parks, towns, countries, worlds, or any of a variety of other types of locations. A user interacting with the virtual world, who may be represented by an avatar displayed within the virtual world, may move between virtual locations to interact with different objects, different users, or to perform different activities available at each location. In one embodiment, a client device 110 displays portions of the virtual world to a user as the user travels between locations. For example, if a user moves from a virtual building to another virtual building, the virtual world generation module 235 communicates instructions to the client device 110 to display graphics of buildings located between the virtual building and the other virtual building in the virtual world while the user moves.

Objects within the virtual world provided by the virtual world generation module 235 represent items capable of being used by user representations within the virtual world or items placed at locations in the virtual world. Example objects in the virtual world include clothing worn by avatars, vehicles, tools, and food. The objects may be virtual objects usable in the virtual world (such as tools usable by an avatar to perform an action in the virtual world) or virtual representations of physical objects (such as images or three-dimensional representations of physical objects that can be purchased by the user and shipped to the user).

As a user interacts with the virtual world, the virtual world generation module 235 communicates information describing the user's interactions with the virtual world to the action log 220. Thus, the action log 220 may maintain a record of locations visited by the user in the virtual world, objects with which the user interacted in the virtual world, purchases made by the user in the virtual world, other users with which the user interacted in the virtual world, activities completed by the user in the virtual world, or any other action performed by the user in the virtual world. Stored information describing the user's interactions with the virtual world may be used by the online system 140 to subsequently modify appearances of objects in the virtual world, locations of objects in the virtual world, or other aspects of the virtual world presented to the user, allowing the online system to personalize the virtual world presented to different users.

To increase user interaction with the virtual world, objects and locations presented in the virtual world may be customized for individual users of the online system 140 interacting with the virtual world. In one embodiment, the virtual world is populated by the object selection module 240, the virtual location module 245, and the virtual store module 250 using information from the user profile store 205, the action log 220, and the edge store 225. Hence, different objects, locations, or representations of users may be presented to different online system users interacting with the virtual world based on information associated with the users by the online system 140.

The object selection module 240 selects one or more objects for inclusion in a virtual world generated by the virtual world generation module 235 for presentation to a user. In one embodiment, the object selection module 240 selects an appearance of one or more of the objects presented to the user in the virtual world. The appearance of an object may specify a brand associated with the object in the virtual world, a size of the object in the virtual world, a style of the object in the virtual world, a color of the object in the virtual world, or other characteristics of the object when presented in the virtual world. For example, the object selection module 240 selects particular brands of shoes or clothing worn by avatars in the virtual world and particular models of cars shown in the virtual world. The object selection module 240 may allow advertisers (such as third party systems 130) to sponsor appearances of one or more objects presented to a user in the virtual world. Different objects in the virtual world are identified by the object selection module 240 to present advertisement content, and the object selection module 240 retrieves information from a sponsorship request from an advertiser describing appearance of an object and presents the object based on the information in the sponsorship request. For example, a pair of shoes worn by an avatar is an object made available by the object selection module 240 to present advertisement content, allowing an advertiser to present a specific brand or style of shoe to a user interacting with the virtual world based on the appearance of the pair of shoes in the virtual world. To present advertisement content via an object in the virtual world, an advertiser provides a sponsorship request to the online system 140 describing an appearance of the object and a bid amount specifying a maximum amount of compensation the online system 140 receives from the advertiser if the object is presented using the appearance specified by the sponsorship request. To determine an appearance of an object in the virtual world, the object selection module 240 selects between an appearance of the object generated within the virtual world by the online system 140 and one or more appearances specified by advertisers in sponsorship requests. Selecting appearances of objects presented in the virtual world is further described below in conjunction with FIG. 3.

The virtual location module 245 generates locations within the virtual world in which objects are presented and a layout of the locations relative to one another. When generating the virtual world, the virtual location module 245 generates one or more native locations allowing a user interacting with the virtual world to interact with other users or to interact with objects at the native locations. A designer of the virtual world specifies the positions of native locations relative to each other or relative to other locations in some embodiments; alternatively, one or more rules maintained by the virtual location module 245 determine positions of one or more native locations relative to each other and/or relative to other locations. In one embodiment, one or more locations generated by the virtual location module 245 are associated with one or more third party systems 130. For example, a location in the virtual world is a virtual store selling products provided by a third party system 130, and the virtual location module 245 generates the store and an appearance of a storefront for the store for presentation to a user via a client device 110. The third party system 130 provides the online system 140 with sponsorship requests for a location at a specified position in the virtual world that includes information describing presentation of the location and a bid amount specifying a maximum amount of compensation the online system 140 receives from the third party system 130 for presenting the location based on the sponsorship request. A sponsorship request may specify a position of a location associated with a third party system 130 relative to a user's position in the virtual world or specify a location associated with the third party system 130 relative to other locations in the virtual world (e.g., along a path a user would travel between two other locations in the virtual world). Based at least in part on the bid amounts of received sponsorship requests, the virtual location module 245 selects a one or more locations associated with third party systems 130 for presentation to a user in the virtual world. The locations selected by the virtual location module 245 are provided to the user within the virtual world, along with other locations in the virtual world provided by the virtual world generation module 235. Placing locations in the virtual world is further described below in conjunction with FIG. 4.

The virtual store module 250 generates a layout of a retail store within the virtual world. A store in the virtual world includes objects available for purchase by a user of the online system 140. Objects in the store may represent virtual items for use in the virtual world, for use when interacting with the online system 140, or for use in interacting with the third party system 130. Alternatively, objects in the store may correspond to real-world items available for purchase and use by the user. In one embodiment, a virtual store is displayed via a client device 110 using two- or three-dimensional graphics imitating the appearance of a physical store. For example, objects in the store are spatially distributed throughout the store and may be displayed on shelves or displays. A user of the online system 140 moves throughout the virtual store to view objects available in the store. In one embodiment, the user uses input devices of the client device 110 to manipulate the objects. For example, input received by the client device 110 allows a user to pick up objects in the store, rotate object in the store, drive virtual car included in the store, use tools in the store, and try clothing items in the store on an avatar representing the user. The virtual store may also include graphics representing other users of the online system 140 or characters in the virtual world.

Using information associated with a user by the online system 140, the virtual store generation module 250 customizes appearance of the store for display to the user. Customizing appearance of a store in the virtual world for different users of the online system 140 may increase user interaction with the store by highlighting different objects sold by the store for different users. To customize a store in the virtual world for a user, the virtual store generation module 250 selects one or more objects for inclusion in the store, a layout of the store, and/or representations of other users to be depicted within the store based on information associated with the user in the user profile store 205, in the content store 210, in the action log 220, and/or in the edge store 225. Configuring presentation of a store in the virtual world is further described below in conjunction with FIG. 5.

The web server 255 links the online system 140 via the network 120 to the one or more client devices 110, as well as to the one or more third party systems 130. The web server 140 serves web pages, as well as other web-related content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or BlackberryOS.

Sponsoring Items in a Virtual World

Figure 3:
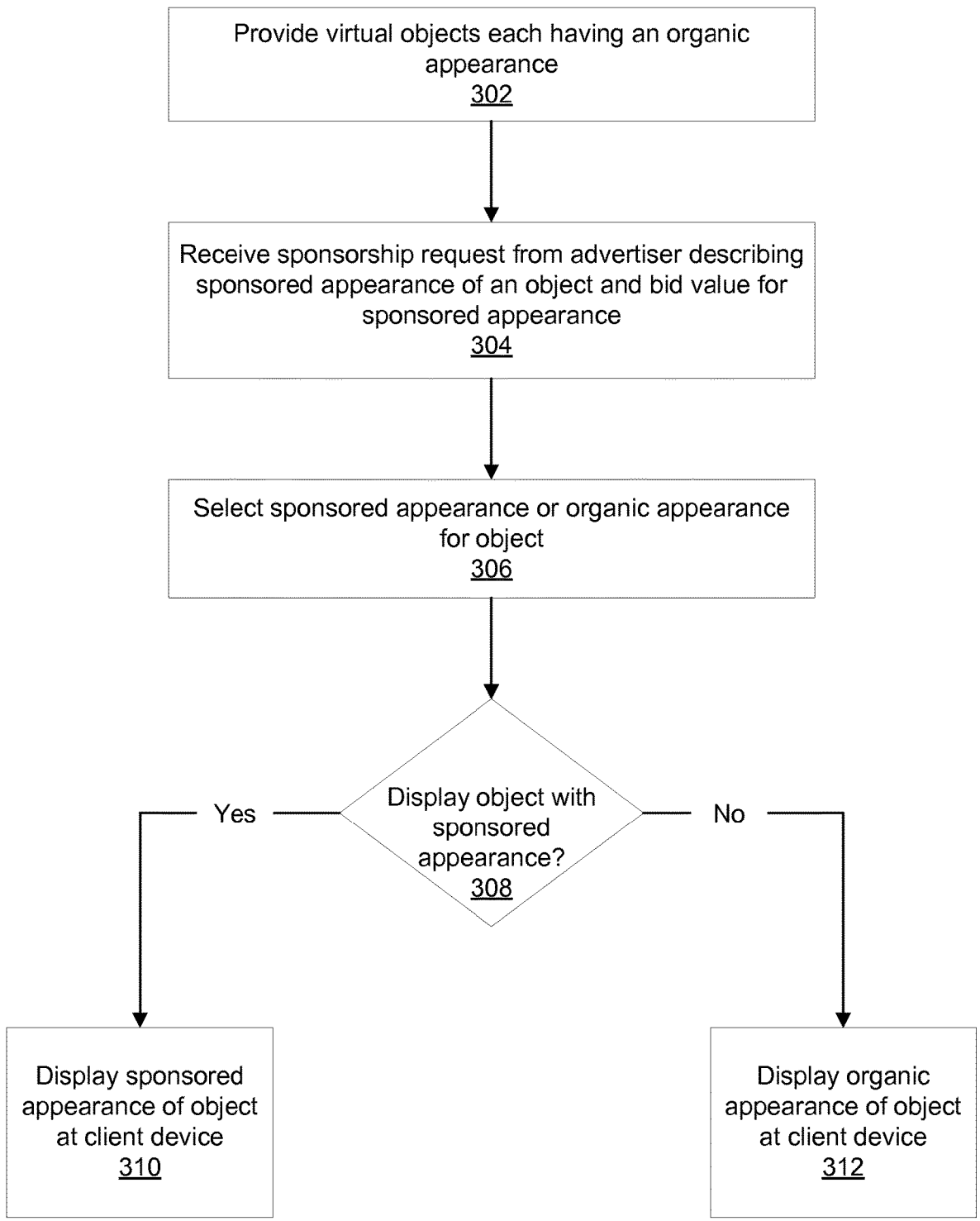
FIG. 3 is a flowchart illustrating a method for selecting appearances of objects in a virtual world, in accordance with one embodiment.

FIG. 3 is a flowchart illustrating one embodiment of a method for selecting appearances of objects in a virtual world. In one embodiment, the method shown in FIG. 3 is performed by the online system 140. Other embodiments may perform additional, fewer, or different steps than those described in conjunction with FIG. 3, or the steps of the method may be performed in different orders than the order described in conjunction with FIG. 3.

The online system 140 provides 302 a plurality of virtual objects in a virtual world. Each object in the virtual world has an appearance describing presentation of the object to a user by a client device 110. The appearance of an object specifies one or more of: a shape of the object in the virtual world, a style of the object in the virtual world, a color of the object in the virtual world, a brand of the object in the virtual world, and a size of the object in the virtual world. For example, if an object is a shoe, different appearances of the object in the virtual world include different brands of shoes (e.g., NIKE® or MANOLO BLAHNIK®), different styles of shoes (e.g., athletic or pump shoes), and different colors of shoes (e.g., black or brown). An object in the virtual world may have an appearance designated by the online system 140, which is referred to herein as the object's "organic appearance." The organic appearance of the object may be a default appearance of an object; for example, a designer of the virtual world specifies the organic appearance of an object. Alternatively, the online system 140 selects an organic appearance of an object based on a likelihood of a user being presented with the object having an interest in the selected appearance, an affinity of the user for the selected appearance, or a likelihood of the user interacting with the selected appearance. The online system 140 may determine the user's interest in, or affinity for, or likelihood of interacting with an object's appearance based on explicit information stored in the user's user profile, implicit information derived from the user profile (e.g., connections between the user and other users, actions associated with the user), or explicit or implicit information in a user profile of a user connected to the user via the online system 140. For example, the online system 140 determines the user has expressed an explicit interest in a brand (e.g., by connecting to a page or other object associated with the brand and maintained by the online system 140 or liking a page associated with the brand in the online system 140), and determines an affinity of the user for the brand based on the explicit information. Based on the affinity of the user for the brand, the online system 140 determines an organic appearance of the object based on the brand. As another example, the online system 140 determines from prior interactions by the user that the user has a tendency to purchase clothing items in a particular color (e.g., a threshold percentage of clothing purchases are clothes in the particular color), and determines the user has an affinity for clothes in that color; hence, the online system 140 determines an organic appearance for objects in the virtual world corresponding to clothes so the objects are presented in the particular color. In yet another example, the online system 140 determines an affinity of the user for another user of the online system 140, identifies a brand in which the other user has expressed an explicit interest, and determines the affinity of the user for the brand based on the user's affinity for the other user. Based at least in part on the affinity of the user for the brand, the online system 140 determines an organic appearance for an object. For an object in the virtual world, the online system 140 selects an organic appearance for the object based on affinities of the user to be presented with the object for different characteristics (e.g., color, brand, size, style, etc.) of the object's appearance and selects characteristics of the object's organic appearance as characteristics for which the user has a maximum affinity. For example, the organic appearance of an object has a color for which the user has a maximum affinity, a brand for which the user has a maximum affinity, and a style for which the user has a maximum affinity based on information associated with the user by the online system 140.

For one or more objects in the virtual world, the online system 140 receives 304 a sponsorship request ("ad request") to sponsor the appearance of the one or more objects in the virtual world. In some embodiments, an advertiser provides a sponsorship request to the online system 140 to sponsor the appearance of any object in the virtual world. Alternatively, the advertiser provides ad requests to sponsor the appearance of objects designated by the online system 140 as eligible to have sponsored appearances. To sponsor an appearance of an object in the virtual world, an advertiser provides a sponsorship request to the online system 140 including information describing a sponsored appearance for the object, such as a graphic of the sponsored appearance for rendering at a client device 110. The sponsorship request also includes a bid amount specifying a maximum amount of compensation the advertiser provides the online system 140 for displaying the object with the sponsored appearance included in the sponsorship request. Additionally, the sponsorship request may include targeting criteria specifying characteristics of users, so the sponsored appearance specified by the sponsorship request is eligible for presentation to users with characteristics satisfying at least a threshold number of the targeting criteria and is not eligible for presentation to users with characteristics satisfying less than the threshold number of the targeting criteria. The online system 140 may store the sponsorship requests provided by the advertiser in the ad request store 230, and access stored sponsorship requests when an opportunity to present and object to the user via the virtual world is identified.

When an opportunity to present an object to the user via the virtual world is identified by the online system 140, the online system 140 selects 306 an appearance for the object from the organic appearance of the object and one or more sponsored appearances from the object. In one embodiment, to select 306 an appearance for an object to display in the virtual world via a client device 110, the online system 140 identifies candidate appearances for the object as the organic appearance of the object and one or more sponsored appearances for the object eligible for presentation to the user (e.g., sponsored appearances included in sponsorship requests having at least a threshold number of targeting criteria satisfied by characteristics of the user) and determines a score for each of the candidate appearances of the object. A score for the organic appearance of the object represents the affinity of the user to the organic appearance. The score, referred to herein generally as an "affinity score," may be generated by applying a weighted function accounting for the affinity of a user to one or more characteristics of the object's appearance. For example, the online system 140 determines characteristics of an object's organic appearance (e.g., a brand, a style, and a color) and determines the affinity of the user for the object's organic appearance based on the user's affinity to each of the characteristics of the organic appearance.

Additionally, the online system 140 also generates a score for each sponsored appearance of the object received from an advertiser. The score for a sponsored appearance is based on an amount of expected revenue of the online system 140 for displaying the object with the sponsored appearance to the user and an affinity score of the user for the sponsored appearance. In one embodiment, a score for a sponsored appearance is generated based on a value of a bid amount included in a sponsorship request specifying the sponsored appearance and the user's affinity for the sponsored appearance (e.g., the likelihood of the user interacting with the object presented with the sponsored appearance). The affinity score of the user for the sponsored appearance may be generated in a similar manner to the affinity score of an organic object appearance described above.

In some embodiments, the online system 140 normalizes the scores for the organic appearance of the object and the sponsored appearances of the object to a common scale, and selects 306 an appearance of the object from the organic appearance and the sponsored appearances from the scores. In various embodiments, the online system 140 determines an expected value associated with various sponsorship requests including sponsored appearances eligible for presentation to the user based on their bid amounts and selects a sponsored appearance associated with a maximum expected value or associated with at least a threshold expected value for presentation. An expected value associated with a sponsorship request represents an expected amount of compensation to the online system 140 for presenting an object using the sponsored appearance specified by the sponsorship request. For example, the expected value associated with a sponsorship request is a product of the sponsorship request's bid amount and a likelihood of the user interacting with an object presented in the virtual world using the sponsored appearance specified in the sponsorship request. The online system 140 may rank sponsorship requests based on their associated bid amounts and select sponsorship requests having at least a threshold position in the ranking for presentation to the user. When ranking or selecting sponsored appearances, the online system 140 may identify sponsored appearances having scores equaling or exceeding a score of the organic appearance and select 306 a sponsored appearance from the set as described above. In some embodiments, the online system 140 ranks both the organic appearance of an object and the sponsored appearances of the object in a unified ranking based on bid amounts associated with sponsorship requests including the sponsored appearances and affinity scores of the user for the organic appearance and for the sponsored appearances. Based on the unified ranking, the online system 140 selects 306 an appearance for presenting the object to the user in the virtual world. Selecting sponsorship requests and other content items through a unified ranking is further described in U.S. patent application Ser. No. 13/545,266, filed on Jul. 10, 2012, which is hereby incorporated by reference in its entirety. Alternatively, the online system 140 identifies a sponsored appearance having a maximum score or having a maximum expected value and compares a score for the identified sponsored appearance to the score for the organic appearance. If the score of the identified sponsored appearance equals or exceeds the score for the organic appearance, the online system 140 selects 306 the identified sponsored appearance for the object; however, if the score of the identified sponsored appearance is less than the score for the organic appearance, the online system 140 selects 306 the organic appearance for the object. Hence, the online system 140 selects 306 a sponsored appearance for the object if a score for the sponsored appearance is greater than the score for the organic appearance. Accordingly, the online system 140 selects 306 a sponsored appearance for an object if the expected revenue to the online system 140 (including both compensation from an advertiser and user interaction with the virtual world) for displaying the object using sponsored appearance is greater than the affinity of the user for the organic appearance. The online system 140 may select an organic appearance having a highest score for comparison to one or more sponsored appearances.

Responsive to determining 308 the appearance of the object is the sponsored appearance, the online system 140 displays 310 the object to the user in the virtual world with the sponsored appearance via a client device 110. Alternatively, if the online system 140 determines 380 the appearance of the object is the organic appearance, 308, the online system 140 displays 312 the object to the user in the virtual world with the organic appearance via the client device 110. The process illustrated in FIG. 3 may be performed for each user of the virtual world when opportunities to present objects to a user via the virtual world are identified (e.g., when a user interacts with the virtual world). Accordingly, the objects displayed to one user in the virtual world may have different appearances than the objects displayed to another user, and the appearances of objects displayed to a given user may vary over time.

Placing Locations in a Virtual World

Figure 4:
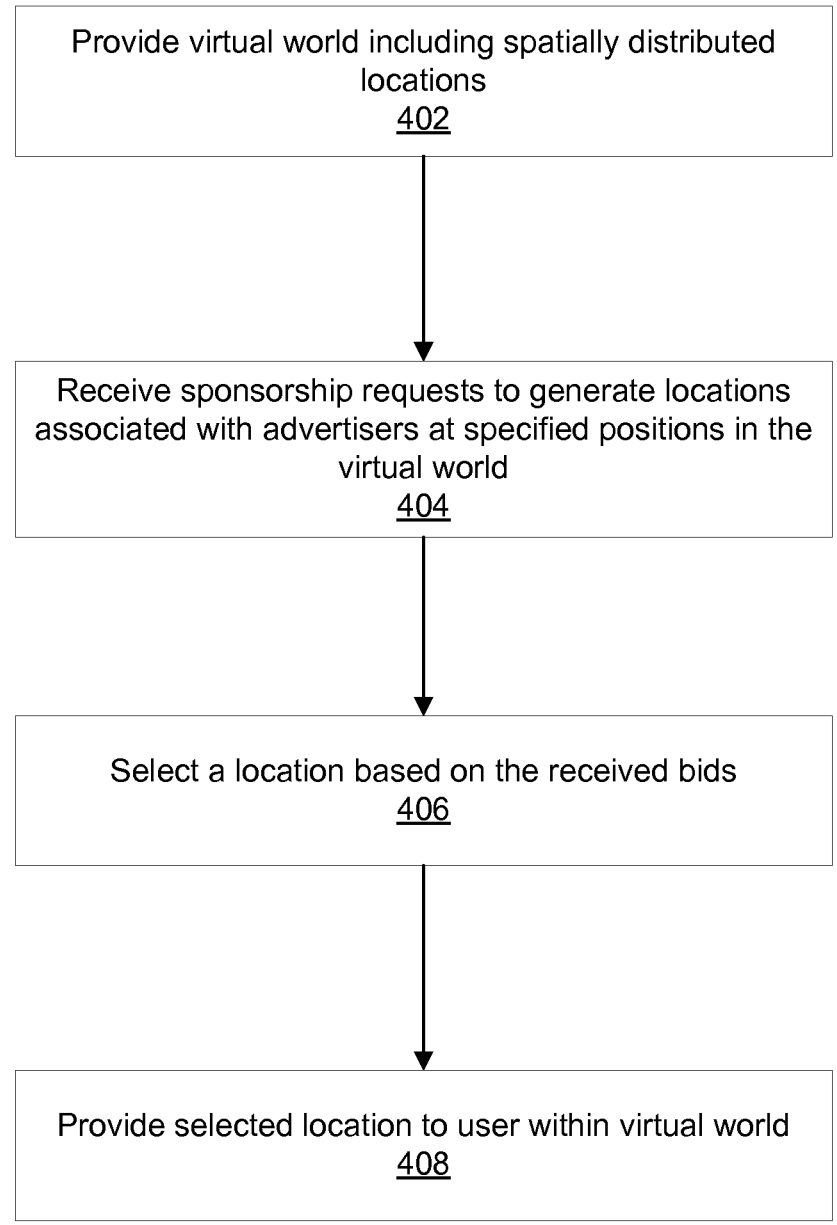
FIG. 4 is a flowchart illustrating a method for placing locations in a virtual world, in accordance with one embodiment.

FIG. 4 is a flowchart illustrating one embodiment of a method for placing locations in a virtual world. In one embodiment, the method shown in FIG. 4 is performed by the online system 140. Other embodiments may perform additional, fewer, or different steps than those described in conjunction with FIG. 4, or the steps of the method may be performed in different orders than the order described in conjunction with FIG. 4.

When presenting a virtual world to a user, the online system 140 provides 402 a plurality of virtual locations that are spatially distributed throughout the virtual world. As described above in conjunction with FIG. 2, the virtual world includes one or more native locations at which a user can interact with other users, interact with objects, and complete activities. As the user interacts with the virtual world, the user may travel around the virtual world to visit different virtual locations. The online system 140 may display various portions of the virtual world to the user as the user moves through the virtual world, including other locations between the locations visited by the user. Thus, although a user may visit only a subset of the locations in the virtual world, the user may view and have the option to visit other locations. Third party systems 130, such as advertisers, may sponsor appearances of locations presented in the virtual world.

The online system 140 receives 404 sponsorship requests from advertisers (e.g., third party systems 130) for generating locations associated with the advertisers within the virtual world or for specifying appearances of locations within the virtual world. Each sponsorship request specifies a position of a location in the virtual world and includes a bid amount representing an amount of compensation the online system 140 receives from the advertiser if the location in the sponsorship request is presented in the virtual world. Additionally, the sponsorship request may include information describing an appearance of the location in the sponsorship request, allowing the advertiser to customize appearance of the location in the virtual world. For example, the sponsorship request includes a graphic of the location to be displayed to a user or other information describing presentation of the location to the user. Additionally, the sponsorship request may include targeting criteria specifying characteristics of users eligible to be presented with the location included in the sponsorship request. Hence, a user having at least a threshold number of characteristics satisfying targeting criteria included in the sponsorship request is eligible to be presented with the location included in the sponsorship request, while another user having less than the threshold number of characteristics satisfying targeting criteria included in the sponsorship request is not eligible to be presented with the location included in the ad request. An example location associated with an advertiser is a virtual store selling products provided by the advertiser; to present the virtual store in the virtual world, the advertiser communicates a sponsorship request including a bid amount, a position in the virtual world for the virtual store, and a graphic of a storefront of the virtual store for presentation via the virtual world.

A sponsorship request received by the online system 140 may specify a position of a location relative to other locations in the virtual world. For example, a sponsorship request identifies a position of a location that is along a path in the virtual world between an additional location and another location, so a user sees the advertiser's location while moving in the virtual world from the additional location to the other location. To specify the path, the advertiser may specify locations at one or more of the path's endpoints. For example, a sponsorship request specifies generation of a location between locations A and B, both of which are frequented by users of the online system 140. The online system 140 then identifies a path in the virtual world between locations A and B. The path identified by the online system 140 may account for characteristics or information associated with a user, so different paths between locations A and B may be identified by the online system 140 for different users, allowing the location have different positions in virtual worlds presented to different users. As another example, a sponsorship request specifies generation of location between a current position of a user and an additional location in the virtual world. The online system 140 then identifies a path between the user's current position and the additional location. In yet another example, the bid specifies the advertiser's location is to be generated between an additional location and an expected location subsequent to the additional location. The online system 140 predicts the expected location subsequent to the additional location which for a user to visit after the user has visited the additional location based on characteristics associated with the user (e.g., locations the user has previously visited, actions associated with the user by the online system 140, demographic information associated with the user by the online system 140) and also identifies a path between the additional location and the expected location. Additionally, information associated with other online system users may be used predict the expected location and/or the path between the additional location and the expected location; for example, locations visited by various online system users or actions associated with various online system users are used by the online system 140 to predicted the expected location or to determine a path between the additional location and the expected location.

If multiple paths are available for a user to traverse between an additional location and another location, the online system 140 identifies a path most likely to be traversed by the user based on paths previously traveled by the user or by other users of the online system 140 (e.g., paths between the additional location and the other location taken by various users, paths between the additional location and the other location taken by online system users having at least a threshold number of percentage of characteristics matching or similar to characteristics of the user). For various paths between the additional location and the other location, the online system 140 scores the paths according to a number of users who have used the path or a total number of times the path has been used, and selects the path having the highest score as the path the target user is expected to travel. In some embodiments, the online system 140 scores a path based on a number of additional users having at least a threshold number or percentage of characteristics matching characteristics of the user who have used the path or based on a number of additional users for whom the user has at least a threshold affinity who have used the path. Alternatively, the online system 140 identifies the path when the user begins traveling between the additional location and the other location.

Additionally or alternatively, a sponsorship request received by the online system 140 specifies that the location included in the sponsorship request is generated a specified distance from a current position of a user in the virtual world. For example, a sponsorship request specifies generation of a location a specified distance from a current position of the user in the virtual world, regardless of the user's future direction of travel. A sponsorship request may also specify generation of a location at a position at which a user enters the virtual world (a "spawn point").

When the online system 140 identifies an opportunity to present a location to the user in the virtual world, the online system 140 selects 406 a bid amount including a location associated with an advertiser, or other third party system 130, to generate at a position specified by the selected sponsorship request. In one embodiment, the online system 140 selects 406 a sponsorship request including a maximum bid amount and generates a location associated with the selected sponsorship request at a position specified by the sponsorship request. For example, if multiple sponsorship requests are received for generating locations associated with various advertisers at a spawn point in the virtual world, the online system 140 selects 406 a sponsorship request including a maximum bid amount and generates a location included in the selected sponsorship request. As another example, if multiple ad requests are received for generating locations associated with one or more advertisers along a path between an additional location and another location, the online system 140 selects 406 sponsorship requests having bid amounts equaling or exceeding a threshold amount. Alternatively, the online system 140 ranks the sponsorship requests based on their bid amounts and selects 406 sponsorship requests having at least a threshold position in the ranking. In some embodiments, the online system 140 generates a score for each sponsorship request, where a score associated with a sponsorship request is based on a bid amount included in the sponsorship request as well as an affinity of the user for the location included in the sponsorship request. For example, the score for a sponsorship request is an expected value to the online system 140 for presenting the location in the sponsorship request determined from the user's affinity for the location in the sponsorship request and the bid amount in the sponsorship request. When selecting 406 sponsorship requests, the online system 140 accounts for targeting criteria included in sponsorship requests by identifying a set of sponsorship requests that include at least a threshold number of targeting criteria satisfied by characteristics of the user and selects 406 sponsorship requests from the set, as described above.

The online system 140 generates one or more locations specified by selected sponsorship requests and provides 408 the virtual world including the generated one or more locations to the user via the client device 110. As the user interacts with the virtual world via a client device 110, the generated one or more locations are displayed, allowing the user to interact with the generated locations. For example, if a generated location is a virtual store, the user may choose to enter the store and purchase products provided by the advertiser through the virtual world.

Configuring Virtual Stores

Figure 5:
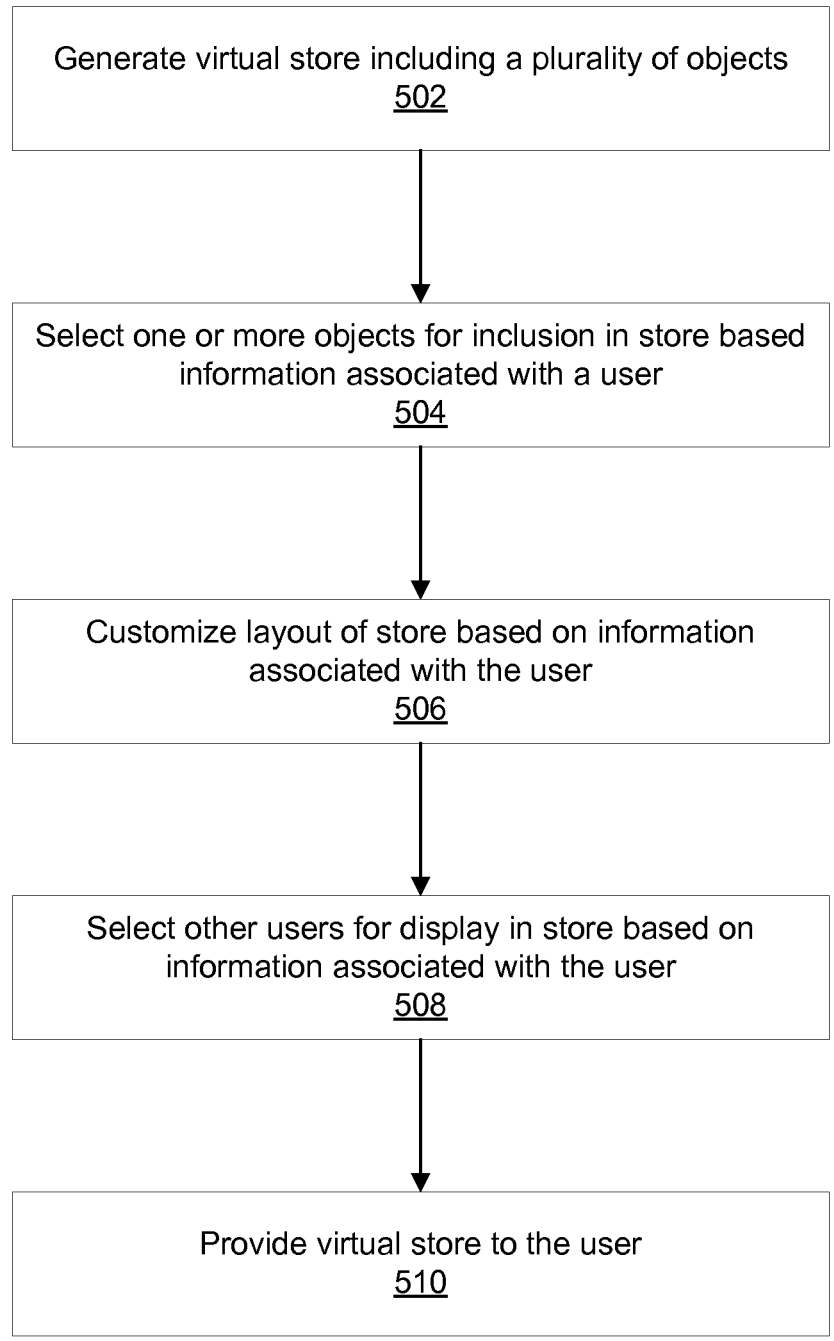
FIG. 5 is a flowchart illustrating configuring virtual stores provided in a virtual world, in accordance with one embodiment.

FIG. 5 is a flowchart illustrating one embodiment of a method for configuring virtual stores provided in a virtual world. In one embodiment, the method shown in FIG. 5 is performed by the online system 140. Other embodiments may perform additional, fewer, or different steps than those described in conjunction with FIG. 5, or the steps of the method may be performed in different orders than the order described in conjunction with FIG. 5.

The online system 140 generates 502 a virtual store including a plurality of objects for display to a user via the virtual world. Objects provided in the virtual store are available for purchase by the user and may include virtual objects usable in the virtual world or representations of physical objects. The object may be provided by the online system 140, by a third party system 130, or by another source. As described above in conjunction with FIG. 2, the online system 140 may generate 502 the virtual store using graphics imitating the appearance of a physical store, so objects in the virtual store are spatially distributed throughout the store and presented in various displays and in various positions relative to each other.

Based on information associated with the user by the online system 140, which the online system 140 retrieves, the online system 140 selects 504 one or more objects for inclusion in the virtual store when an opportunity to present objects to the user via the virtual store is identified. Information associated with the user includes information in a user profile associated with the user, actions associated with the user, and connections between the user and other users. In one embodiment, the online system 140 selects 504 objects in which the user has previously expressed an interest through actions performed by the user. For example, the online system 140 selects 504 an object the target user has previously purchased or previously added to a shopping cart for purchase, an object the user has previously viewed, an object for which the user has previously expressed a preference, an object the user has previously shared with another user, or an object for which the target user has previously provided explicit positive feedback. Alternatively, the online system 140 selects 504 an object having a characteristic in which the user has previously expressed an interest. For example, the online system 140 selects an object associated with a brand for which the user has previously indicated a preference. As another example, the online system 140 selects 504 an object having a threshold number or percentage of characteristics matching characteristics of an object the user has previously purchased or of an object for which the user has previously expressed a preference.

The online system 140 may additionally or alternatively select 504 objects in which one or more users connected to the user via the online system 140 have previously expressed an interest. For example, an additional user connected to the user via the online system 140 purchases an object in the virtual store provided by the online system 140 or via a third party system 130, views an object in the virtual store, or provides explicit positive feedback for an object. Based on an affinity of the user for the additional user, the online system 140 determines if the user is likely to be interested in the object with which the additional user interacted. In some embodiments, the online system 140 selects 504 the object with which the additional user interacted if the affinity of the user for the additional user equals or exceeds a threshold.

Furthermore, the online system 140 may select 504 objects in which the user is expected to be interested based at least in part on the user's interest in one or more other objects. For example, the online system 140 selects 504 one or more objects associated with topics matching or similar to interests or topics associated with the user by the online system 140. To determine expected interest of the user in an object, the online system 140 accesses data indicating objects in which users have expressed interest, such as users having at least a threshold number of characteristics matching or similar to characteristics of the user or users for whom the user has at least a threshold affinity. Based on the historical interests of the users, the online system 140 generates clusters of objects that each include two or more objects in which a plurality of users have expressed an interest. Thus, each cluster includes an object in which a user of the online system 140 who has expressed an interest in another object in the cluster is likely to be interested. The clusters of objects may be identified using any suitable clustering algorithms, which may output a probability of an object belonging to a given cluster. Clustering objects allows the online system 140 to identify probabilities of objects being of interest to the user based on the user's interest in a given object, and selects 504 one or more objects having a at least a threshold probability of being included in a cluster including the given object for inclusion in the virtual store.

In one embodiment, advertisers provide the online system 140 with sponsorship requests for placing objects in the virtual store. A sponsorship request identifies an object and includes a bid amount specifying an amount of compensation to the online system 140 from the advertiser for presenting the identified object in the virtual store. Based in part on the bid amounts included in sponsorship requests, the online system 140 selects 504 objects from various sponsorship requests for presentation in the virtual store. For example, a sponsorship request identifies a particular object in which an additional user connected to the user has previously expressed interest or in which the target user is expected to be interested. Alternatively, a sponsorship request identifies an object in which users connected to the target user have not expressed interest or in which target user is not expected to be interested by the online system 140. A sponsorship request may include targeting criteria specifying characteristics of users eligible to be presented with the object included in the sponsorship request. Hence, a user having at least a threshold number of characteristics satisfying targeting criteria included in the sponsorship request is eligible to be presented with the object included in the sponsorship request, while another user having less than the threshold number of characteristics satisfying targeting criteria included in the sponsorship request is not eligible to be presented with the object included in the ad request.

To select 504 objects for inclusion in the virtual store, the online system 140 generates scores associated with various objects. For example, the online system 140 generates a score for each object eligible for presentation to the user (e.g., an object associated with at least a threshold number of targeting criteria satisfied by characteristics of the user). For an object in which the user has previously expressed an interest, the online system 140 generates a score for the object based on an affinity of the user for the object. Similarly, for an object in which an additional user connected to the user has previously expressed an interest, the online system 140 generates a score for the object based on an affinity of the additional user for the object and an affinity of the user for the additional user. For an object selected 504 based on a likelihood of the user being interested in the object, the online system generates a score the object based on a measure of similarity between the object and objects in which the user has expressed an interest. For example, a score for an object is generated based on a probability of the object belonging to a cluster including another object in which the user has expressed interest and an affinity of the user to the other object in the cluster in which the user has expressed interest. For an object included in a sponsorship request, the online system 140 generates a score for the object based at least in part on an affinity of the user for the object and a bid amount included in the ad request including the object, which represents an expected revenue to the online system 140 for including the object in the virtual store.

In one embodiment, the online system 140 normalizes the scores generated for different objects eligible for presentation to users to a common scale and ranks the available objects eligible for presentation to users based on the scores.

For example, the online system 140 selects 504 objects having at least a threshold score. As another example, the online system 140 ranks objects based on their associated scores and selects 504 objects having at least a threshold position in the ranking. In another embodiment, the online system 140 selects 504 a specified number objects having different characteristics based on the scores. For example, the online system 140 selects a threshold number of objects in which the user has an interest having at least a threshold score, a threshold number of objects in which additional users connected to the user have an interest that have at least a threshold score, a threshold number of objects in which the target user is likely to be interested based on the user's interest in other objects in which the user has an interest and having at least a threshold score. Selecting objects having different characteristics for inclusion in the virtual store allows the online system 140 to increase the user's interaction with the virtual store by providing objects in which the user has an interest, as well as additional objects in which the user is likely to have an interest to increase the likelihood of the user interacting with objects included in the virtual store.

The online system 140 also customizes 506 a layout of the virtual store based on information associated with the user by the online system 140; the layout of the store identifies placement of objects in the store relative to each another and relative to a position of the user in the store. Customizing the layout of the virtual store allows the online system to draw the user's attention to particular objects. For example, an object placed closer to the position of the user is more likely to be seen by the user, which increases the likelihood of the user interacting with the object. Prominent positions in the virtual store, such as end displays, shelves at an eye level of the user's avatar, mannequins, and the like, may also draw the user's attention to objects placed at these positions, increasing the likelihood of the user interacting with the objects. Different positions in the virtual store may be associated with different levels of prominence based on rankings assigned to the virtual store by a designer of the store or based on interactions by other users with objects presented in other virtual stores. In one embodiment, the online system 140 selects a position for an object in the virtual store based at least in part on an affinity of the user for the object. For example, the online system 140 selects objects more prominent positions in the virtual store for objects for which the user has higher affinities than for objects for which the user has lower affinities. Thus, customizing 506 the layout of the virtual store allows the online system 140 may select one or more objects for placement in positions in the store likely to encourage user interaction with the selected one or more objects.

In some embodiments, the online system 140 selects a position for an object in the virtual store based on bid amounts in ad requests including objects received from one or more advertisers. For example, a sponsorship request includes information specifying a position in the virtual store in which to display an object included in the sponsorship request as well as a bid amount specifying an amount of compensation provided to the online system 140 by an advertiser associated with the sponsorship request if the object is presented in the specified position in the virtual store. For a position in the virtual store, the online system 140 generates a score for various sponsorship requests including based on the bid amounts of the sponsorship requests and affinities of the user for objects included in various bid amounts; hence, the score for a sponsorship request represents an expected revenue of the online system 140 for displaying an object in the sponsorship request in the position of the virtual store. In various embodiments, the online system 140 selects a sponsorship request associated with a maximum score and presents an object in the selected sponsorship request and in the position of the virtual store. When selecting an object for presentation in a position of the virtual store, the online system 140 may select from objects included in sponsorship requests and objects selected 504 by the online system 140 (e.g., objects for which other users connected to the user have indicated a preference, objects for which the online system 140 determines the user has at least a threshold likelihood of having an interest) by ranking objects selected by the online system based on the affinity of the user for the objects and bid amounts associated with sponsorship requests including objects and affinities of the user for objects in the sponsorship requests. Based on the unified ranking, the online system 140 selects an object for presentation in a position of the virtual store. Selecting sponsorship requests and other content items through a unified ranking is further described in U.S. patent application Ser. No. 13/545,266, filed on Jul. 10, 2012, which is hereby incorporated by reference in its entirety. For example, the online system 140 selects an object included in a sponsorship request for display at a particular position in the store (such as a particular end display) instead of another object if the expected revenue for displaying the object included in the sponsorship request at the specified position is greater than the affinity of the user to the other object.

Additionally, the online system 140 also selects 508 users for whom representations of which are presented to the user in the virtual store. In one embodiment, the online system 140 displays avatars associated with other users within the store, such as one or more users connected to the user via the online system 140. The avatars may be depicted as browsing the store and interacting with objects in the store, or may interact with the user. For example, an avatar of another user is depicted as interacting with an object the other user has previously purchased or with which the other user has otherwise interacted. Information describing a prior interaction with the object by the other user may also be presented along with the avatar of the other user. For example, text or images describing a prior interaction by the other user with the object is presented in the virtual store or content provided to the online system 140 by the other user associated with the object is presented along with the avatar of the other user. Thus, in one embodiment, the online system 140 displays an avatar associated with another user who has purchased an object selected for inclusion in the virtual store when presenting the virtual store to the user. The online system 140 may alternatively select an avatar associated with additional users user to whom the target user has at least a threshold affinity for display in the virtual store.

In one embodiment, the user representations displayed in the virtual store include virtual store employees, which may be characters generated by the online system 140 or by a third party system 130 associated with the virtual store to greet the user, to answer questions, or to draw the user's attention to particular objects. In one embodiment, the online system 140 selects characteristics of the virtual store employees based on information associated with the user by the online system 140. For example, the online system 140 specifies a virtual employee's name as a portion of a name of another user connected to the user via the online system 140 for whom the user has greater than a threshold affinity. As another example, the online system 140 analyzes speech patterns and vocabulary used by the user when providing content to the online system 140 or when communicating with other users of the online system 140, and generates speech of the virtual store employee based on the user's speech patterns and vocabulary. Other characteristics of a virtual store employee that may be customized by the online system 140 include: demographics of the virtual store employee (e.g., an age of the employees), degrees to which the virtual store employee interacts with the target user, and expertise of the virtual store employee.

The online system 140 provides 510 the virtual store, including the selected objects, representations users, and the customized layout, to a client device 110 for presentation to the user. The user may browse the virtual store using the client device 110 and interact with the objects and user representations provided in the store. Customizing the layout of objects and representations of other users presented to the user via the virtual store allows the online system 140 to increase the likelihood of the user interacting with objects in the virtual store or performing interactions with certain objects in the virtual store.

CONCLUSION

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the disclosure is intended to be illustrative, but not limiting, of the scope of the invention, which is set forth in the following claims.

What is claimed is:

1. A computer-implemented method comprising:
providing a virtual world to a user of an online system, the virtual world including a plurality of virtual stores spatially distributed throughout the virtual world;
receiving one or more sponsorship requests from one or more advertisers for generating virtual stores associated with the one or more advertisers in the virtual world, each sponsorship request including an instruction to generate a virtual store along a path between two endpoints in the virtual world, the two endpoints comprising locations in the virtual world having a plurality of paths therebetween, the sponsorship request specifying at least one of the paths' endpoints in the virtual world and a bid amount representing an amount of compensation the online system receives for presenting the virtual store;
identifying an opportunity for virtual store presentation in the virtual world to the user;
selecting a sponsorship request from the one or more sponsorship requests based at least in part on the one or more bid amounts included in the one or more sponsorship requests, where the user's location in the virtual world is along one of the plurality of paths between the endpoints associated with the selected sponsorship request;
determining the path from the plurality of paths between the endpoints associated with the selected sponsorship request based on characteristics associated with the user; and
inserting the virtual store of the selected sponsorship request into the virtual world at a position along the determined path.

2. The method of claim 1, wherein the position of the virtual store of the selected sponsorship request is along the path between a first virtual store and a second virtual store.

3. The method of claim 2, wherein determining the path comprises:
determining the path between the first virtual store and the second virtual store based at least in part on information associated with one or more additional users of the online system.

4. The method of claim 3, wherein determining the path between the first virtual store and the second virtual store based at least in part on information associated with the one or more additional users of the online system comprises:
identifying candidate paths in the virtual world between the first virtual store and the second virtual store; and
selecting a path from the candidate paths based at least in part on information associated with the one or more additional users who previously traversed at least one of the candidate paths.

5. The method of claim 1, wherein selecting the sponsorship request from the one or more sponsorship requests based at least in part on the one or more bid amounts included in the one or more sponsorship requests comprises:

determining a score for each of the one or more sponsorship requests including generation of the position of the virtual store along the path based at least in part on the bid amount included in the sponsorship request and affinities of the user for the position along the path; and selecting a sponsorship request having a maximum score.

6. The method of claim 1, wherein the position of the virtual store is along a path between a first virtual store and a current position of the user.

7. The method of claim 1, wherein the position of the virtual store is where the user enters the virtual world.

8. The method of claim 1, wherein the position of the virtual store is a specified distance away from a position of the user in the virtual world.

9. The method of claim 1, wherein each of the one or more sponsorship requests further includes a graphic of the virtual store included in the sponsorship request, and wherein inserting the generated virtual store comprises providing the graphic included in the sponsorship request including the selected virtual store.

10. The method of claim 1, wherein selecting the sponsorship request from the one or more sponsorship requests based at least in part on the one or more bid amounts included in the one or more sponsorship requests comprises:

determining a score for each of the one or more sponsorship requests based at least in part on the bid amount included in the sponsorship request and affinities of the user for the virtual store; and selecting a sponsorship request having a maximum score.

11. A computer program product comprising a non-transitory computer-readable storage medium having instructions encoded thereon that, when executed by a processor, cause the processor to:

provide a virtual world to a user of an online system, the virtual world including a plurality of virtual stores spatially distributed throughout the virtual world;

receive one or more sponsorship requests from one or more advertisers for generating virtual stores associated with the one or more advertisers in the virtual world, each sponsorship request including an instruction to generate a virtual store along a path between two endpoints in the virtual world, the two endpoints comprising locations in the virtual world having a plurality of paths therebetween, the sponsorship request specifying at least one of the paths' endpoints in the virtual world and a bid amount representing an amount of compensation the online system receives for presenting the virtual store;

identify an opportunity for virtual store presentation in the virtual world to the user;

select a sponsorship request from the one or more sponsorship requests based at least in part on the one or more bid amounts included in the one or more sponsorship requests, where the user's location in the virtual world is along one of the plurality of paths between the endpoints associated with the selected sponsorship request;

determine the path from the plurality of paths between the endpoints associated with the selected sponsorship request based on characteristics associated with the user; and insert the virtual store of the selected sponsorship request into the virtual world at a position along the determined path.

12. The computer program product of claim 11, wherein the position of the virtual store of the selected sponsorship request is along the path between a first virtual store and a second virtual store.

13. The computer program product of claim 12, wherein determine the path comprises:

determine the path between the first virtual store and the second virtual store based at least in part on information associated with one or more additional users of the online system.

14. The computer program product of claim 13, wherein determination of the path between the first virtual store and the second virtual store based at least in part on information associated with the one or more additional users of the online system comprises:

identify candidate paths in the virtual world between the first virtual store and the second virtual store; and select a path from the candidate paths based at least in part on information associated with the one or more additional users who previously traversed at least one of the candidate paths.

15. The computer program product of claim 11, wherein selection of the sponsorship request from the one or more sponsorship requests based at least in part on the one or more bid amounts included in the one or more sponsorship requests comprises:

determine a score for each of the one or more sponsorship requests including the generation of the position of the virtual store along the path based at least in part on the bid amount included in the sponsorship request and affinities of the user for the position along the path; and select a sponsorship request having a maximum score.

16. The computer program product of claim 11, wherein the position of the virtual store is along a path between a first virtual store and a current position of the user.

17. The computer program product of claim 11, wherein the position of the virtual store is where the user enters the virtual world.

18. The computer program product of claim 11, wherein selection of the sponsorship request from the one or more sponsorship requests based at least in part on the one or more bid amounts included in the one or more sponsorship requests comprises:

determine a score for each of the one or more sponsorship requests based at least in part on the bid amount included in the sponsorship request and affinities of the user for the virtual store; and select a sponsorship request having a maximum score.

* * * * *